United States Patent
Cahn

(10) Patent No.: US 7,873,569 B1
(45) Date of Patent: Jan. 18, 2011

(54) WEB-BASED LOAN AUCTIONS FOR INDIVIDUAL BORROWERS AND LENDERS

(76) Inventor: Robert Cahn, Gipsy Trail Club, 607 Gipsy Trail Rd., Carmel, NY (US) 10512

( * ) Notice: Subject to any disclaimer, the term of this patent is extended or adjusted under 35 U.S.C. 154(b) by 323 days.

(21) Appl. No.: 11/330,840

(22) Filed: Jan. 12, 2006

(51) Int. Cl.
G06Q 40/00 (2006.01)

(52) U.S. Cl. .............................. 705/38; 705/35; 705/37

(58) Field of Classification Search ................... 705/35, 705/37, 38
See application file for complete search history.

(56) References Cited

U.S. PATENT DOCUMENTS

| | | | |
|---|---|---|---|
| 5,966,699 A | 10/1999 | Zandi | |
| 6,622,131 B1 * | 9/2003 | Brown et al. | 705/38 |
| 6,629,082 B1 | 9/2003 | Hambrecht et al. | |
| 6,671,674 B1 | 12/2003 | Anderson et al. | |
| 6,778,968 B1 | 8/2004 | Gulati | |
| 6,901,384 B2 | 5/2005 | Lynch et al. | |
| 6,920,434 B1 | 7/2005 | Cossette | |
| 7,146,337 B1 * | 12/2006 | Ward et al. | 705/38 |
| 2002/0038285 A1 | 3/2002 | Golden et al. | |
| 2003/0041003 A1 | 2/2003 | Kayser, III | |
| 2006/0149665 A1 * | 7/2006 | Weksler | 705/38 |
| 2006/0224502 A1 * | 10/2006 | McGowan | 705/38 |
| 2007/0073613 A1 * | 3/2007 | Lee | 705/38 |

OTHER PUBLICATIONS

Online Banking: RateGenius Signs Up Customer for Web Loan Auction Service Carol Power. American Banker. New York, N.Y.: Jul. 12, 2000. vol. 165, Iss. 132; p. 12.*
BT, Vodafone hunt out core banks as loan pipeline swells Anonymous. Euroweek. London: May 5, 2000. p. 1.*

* cited by examiner

Primary Examiner—Lalita M Hamilton
(74) Attorney, Agent, or Firm—Wendy W. Koba

(57) ABSTRACT

A web-based loan auction system is available to individual borrowers and individual lenders and is particularly well-suited for individual borrowers that cannot meet the standards of conventional lending institutions. The system is also attractive to potential lenders that desire to achieve a higher return on their investment than currently offered by banks. The potential borrower submits a web-based loan application to the auction system. Once the loan application information is verified (a function performed by the agency offering the auction service), the application is translated into an "anonymous" version, where the personal information of the borrower himself is replaced by "placeholders" known and controlled by the auction service. The "anonymized" version of the loan application is then posted on the auction's web site for bidding by potential lenders.

6 Claims, 4 Drawing Sheets

*FIG. 2(a)*

| APPLICANT | |
|---|---|
| MARITAL STATUS | |
| NUMBER OF DEPENDENTS | |
| ADDRESS | |
| CURRENT EMPLOYER | |
| TIME IN CURRENT POSITION | |
| ANNUAL SALARY | |
| RESIDENCE (RENT, OWN) | |
| HOME VALUE (IF OWNED) | |
| FIRST MORTGAGE AMOUNT | |
| SECOND MORTAGE? AMOUNT | |
| CREDIT CARD DEBT | |
| CREDIT CARD RATE | |
| AUTOMOBILE(S) TYPE | *COMPLETE FOR EACH CAR OWNED* |
| AUTOMOBILE VALUE(S) | *COMPLETE FOR EACH CAR OWNED* |
| AUTOMOBILE LOAN PAYMENTS | *COMPLETE FOR EACH CAR OWNED* |
| OTHER MONTHLY PAYMENTS | |
| NET WORTH | |

10 → NET WORTH

*FIG. 2(b)*

| APPLICANT | JOHN QUEUE |
|---|---|
| MARITAL STATUS | MARRIED |
| NUMBER OF DEPENDENTS | 1 (ONE) |
| ADDRESS | 234 MAIN STREET, ANYTOWN NEW YORK |
| CURRENT EMPLOYER | SECONDARY SCHOOL TEACHER |
| TIME IN CURRENT POSITION | 8 YEARS, 4 MONTHS |
| ANNUAL SALARY | $52,250 |
| RESIDENCE (RENT, OWN) | OWNER-OWNED |
| HOME VALUE (IF OWNED) | $260,000 |
| FIRST MORTGAGE AMOUNT | $80,000 |
| SECOND MORTAGE? AMOUNT | N/A |
| CREDIT CARD DEBT | $22,000 |
| CREDIT CARD RATE | 16.9% |
| AUTOMOBILE(S) TYPE | 2001 FORD FOCUS |
| AUTOMOBILE VALUE(S) | $5600 |
| AUTOMOBILE LOAN PAYMENTS | $255 |
| OTHER MONTHLY PAYMENTS | $650 |
| NET WORTH | $180,000 |

10 → NET WORTH

FIG. 3

| APPLICANT | NAME SUPPLIED WHEN LOAN APPLICATION IS COMPLETED |
|---|---|
| MARITAL STATUS | MARRIED |
| NUMBER OF DEPENDENTS | 1 (ONE) |
| ADDRESS | 10599 |
| CURRENT EMPLOYMENT | SECONDARY SCHOOL TEACHER |
| TIME IN CURRENT POSITION | 8 YEARS, 4 MONTHS |
| ANNUAL SALARY | $52,250 |
| RESIDENCE (RENT, OWN) | OWNER-OWNED HOME |
| HOME VALUE (IF OWNED) | $260,000 |
| FIRST MORTGAGE AMOUNT | $80,000 |
| CREDIT CARD DEBT | $22,000 |
| CREDIT CARD RATE | 16.9% |
| AUTOMOBILE(S) TYPE | 2001 FORD FOCUS |
| AUTOMOBILE VALUE(S) | $5600 |
| AUTOMOBILE LOAN PAYMENTS | $255 |
| OTHER MONTHLY PAYMENTS | $650 |
| NET WORTH | |
| *APPRAISED VALUE OF HOME* | |
| *EMPLOYMENT VERIFICATION* | |
| *HOUSE TITLE VERIFICATION* | |
| *FICO SCORE* | |
| *CREDIT REPORT SUMMARY* | |
| *DETAILED ANONYMIZED CREDIT REPORTS* | |
| *DIGITAL SIGNATURES OF UNALTERED CREDIT REPORTS* | |

15 { (rows from APPRAISED VALUE OF HOME through DIGITAL SIGNATURES)

| LENDER | TOTAL AMOUNT | RATE | ACTIVE AMOUNT |
|---|---|---|---|
| LOANAUCTION | 75,000 | 10% | 75,000 |
| | | | |
| | | | |
| | | | |
| | | | |
| | | | |

FIG. 4(b)

| LENDER | TOTAL AMOUNT | RATE | ACTIVE AMOUNT |
|---|---|---|---|
| LOANAUCTION | 75,000 | 10% | 65,000 |
| ADAM | 10,000 | 8.5% | 10,000 |
| | | | |
| | | | |
| | | | |
| | | | |
| | | | |

FIG. 4(c)

| LENDER | TOTAL AMOUNT | RATE | ACTIVE AMOUNT |
|---|---|---|---|
| LOANAUCTION | 75,000 | 10% | 45,000 |
| ADAM | 10,000 | 8.5% | 10,000 |
| BOB | 20,000 | 8% | 20,000 |
| | | | |
| | | | |
| | | | |
| | | | |

FIG. 4(d)

| LENDER | TOTAL AMOUNT | RATE | ACTIVE AMOUNT |
|---|---|---|---|
| LOANAUCTION | 75,000 | 10% | 37,500 |
| ADAM | 10,000 | 8.5% | 10,000 |
| BOB | 20,000 | 8% | 20,000 |
| CARLENE | 7500 | 8.25% | 7500 |
| | | | |
| | | | |
| | | | |

FIG. 4(e)

| LENDER | TOTAL AMOUNT | RATE | ACTIVE AMOUNT |
|---|---|---|---|
| LOANAUCTION | 75,000 | 10% | 500 |
| ADAM | 10,000 | 8.2% | 10,000 |
| BOB | 20,000 | 7.9% | 20,000 |
| CARLENE | 12,500 | 8.05% | 12,500 |
| DAN | 32,000 | 7.75% | 32,000 |
| | | | |
| | | | |

WEB-BASED LOAN AUCTIONS FOR INDIVIDUAL BORROWERS AND LENDERS

TECHNICAL FIELD

The present invention relates to an automated, web-based methodology for processing and approving loans and, more particularly, to a web-based auction available to individual borrowers and private lenders (i.e., individuals) that allows for a number of separate individual lenders to participate in a single loan.

BACKGROUND OF THE INVENTION

Traditionally, a person in need of a loan, such as a mortgage, goes to a lending institution, such as a local bank. The individual then meets with a lending officer who gives an introduction of the loans that are offered by that particular bank. The prospective borrower will be asked about the amount of the loan he desires, as well as certain preliminary financial information (e.g., gross household income). If the lending officer is satisfied with the borrower's answers, he will ask the borrower to formally fill out a loan application and submit the completed application (along with the application fee) to the bank.

The loan application submitted by the prospective borrower will normally be reviewed by the underwriting department of the bank, which qualifies the borrower for the loan. The information contained in the loan application is first checked to see if it is accurate. If the requested loan is a mortgage, a local real property appraiser will be hired to inspect and appraise the property that is to be mortgaged. Additionally, credit reports are ordered and the borrower's FICO score is obtained from the Fair Isaac Corporation. The underwriting department will then decide, in accordance with lending guidelines of the bank or of a mortgage organization, whether or not the prospective borrower is qualified for the loan.

A loan is granted to the prospective borrower if the bank determines, in accordance with the above-described procedure, that the borrower is qualified. Otherwise, the prospective borrower is denied the loan. Many individuals that are denied a loan based on these traditional criteria, however, remain substantially "good" risks, and are often left without the means to secure the desired loan, or are left with the option of securing a loan at an essentially usurious rate.

In the prior art, there also exist a number of different web-based auction systems, even systems associated with loan processing. One exemplary arrangement, disclosed in U.S. Pat. No. 5,966,699, entitled "System and Method for Conducting Loan Auction over Computer Network" and issued to R. Zandi on Oct. 12, 1999, is related to a computer system that allows for Internet-based loan processing, where the electronic loan application is available for viewing by a number of registered lending institutions, allowing for the borrower to "shop" his loan application to a wider audience than merely his local bank(s). U.S. Pat. No. 6,920,434 discloses an arrangement where a pre-established network of "members" may borrow/loan funds between themselves, using the Internet as the vehicle for publicizing the various loan opportunities among the group members. US Patent Application No. 2002/0038285 is directed to the provision of an electronic "loan marketplace" over the Internet, where this particular disclosure is particularly concerned with providing, processing and "closing" educational loan applications.

While various aspects of these prior art, Internet-based loan arrangements represent advancements over the traditional methods of obtaining loans, there is no mechanism in place that allows for individual borrowers and individual lenders to communicate with each other in a matter that allows for individual lenders to participate in the loan process.

SUMMARY OF THE INVENTION

The need remaining in the prior art is addressed by the present invention, which relates to an automated, web-based methodology for processing and approving loans and, more particularly, to a web-based auction available to individual borrowers and individual lenders that allows for a number of separate individual lenders to participate in a single loan.

In accordance with the present invention, an individual desiring to obtain a loan submits a request to the web-based loan auction system, where the individual will be required to provide information such as that commonly identified with a loan application. In this case, however, once the loan application information is verified (a function performed by the agency offering the auction service), the application is translated into an "anonymous" version, where the personal information of the borrower himself is replaced by "placeholders" known and controlled by the auction service. That is, the borrower's name is replaced with, for example, a 10-digit number. The borrower's street address is replaced with, for example, a 10-digit alpha code, while retaining the city, state and zip code information. The "anonymized" version of the loan application is then posted on the auction's web site for perusal by potential lenders.

It is an aspect of the present invention that the potential lenders are individuals that have been previously authenticated and verified by the auction service, and have placed a sum of money in escrow with the auction service. Thus, when bidding on a particular loan, the amount put toward the loan bid is taken from the lender's escrow fund. In this manner, each lender is considered as a "safe" source of the funds. Of course, each lender may increase his/her escrow amount (through electronic transfer, for example), as a lender engages in additional loan auctions.

Another aspect of the present invention is the ability to "share" the costs of loan insurance among the group of lenders. The cost is pro-rated based on the amount lent by each individual to the borrower.

An advantage of the web-based private loan auction service of the present invention is that individual investors (potential lenders) may spend time reviewing a multitude of different lending opportunities, perhaps searching by type of loan being requested, geographical location of potential borrower, occupation of borrower, and the like. That is, although the information has been scrubbed to appear "anonymous", a sufficient amount of detail regarding the characteristics of each borrower and loan remains, allowing the lending community of investors to make informed choices about loan opportunities.

Other and further advantages and aspects of the present invention will become apparent during the course of the following discussion and by reference to the accompanying drawings.

BRIEF DESCRIPTION OF THE DRAWINGS

Referring now to the drawings,

FIG. 2 contains a number of tables explaining the loan application/anonymizing aspect of the present invention, with FIG. 3 illustrating a supplemental loan application form including additional financial information; and FIGS. 4(a)-(e) contains a number of tables that step through an exemplary loan auction performed in accordance with the present invention.

DETAILED DESCRIPTION

Figure 1:
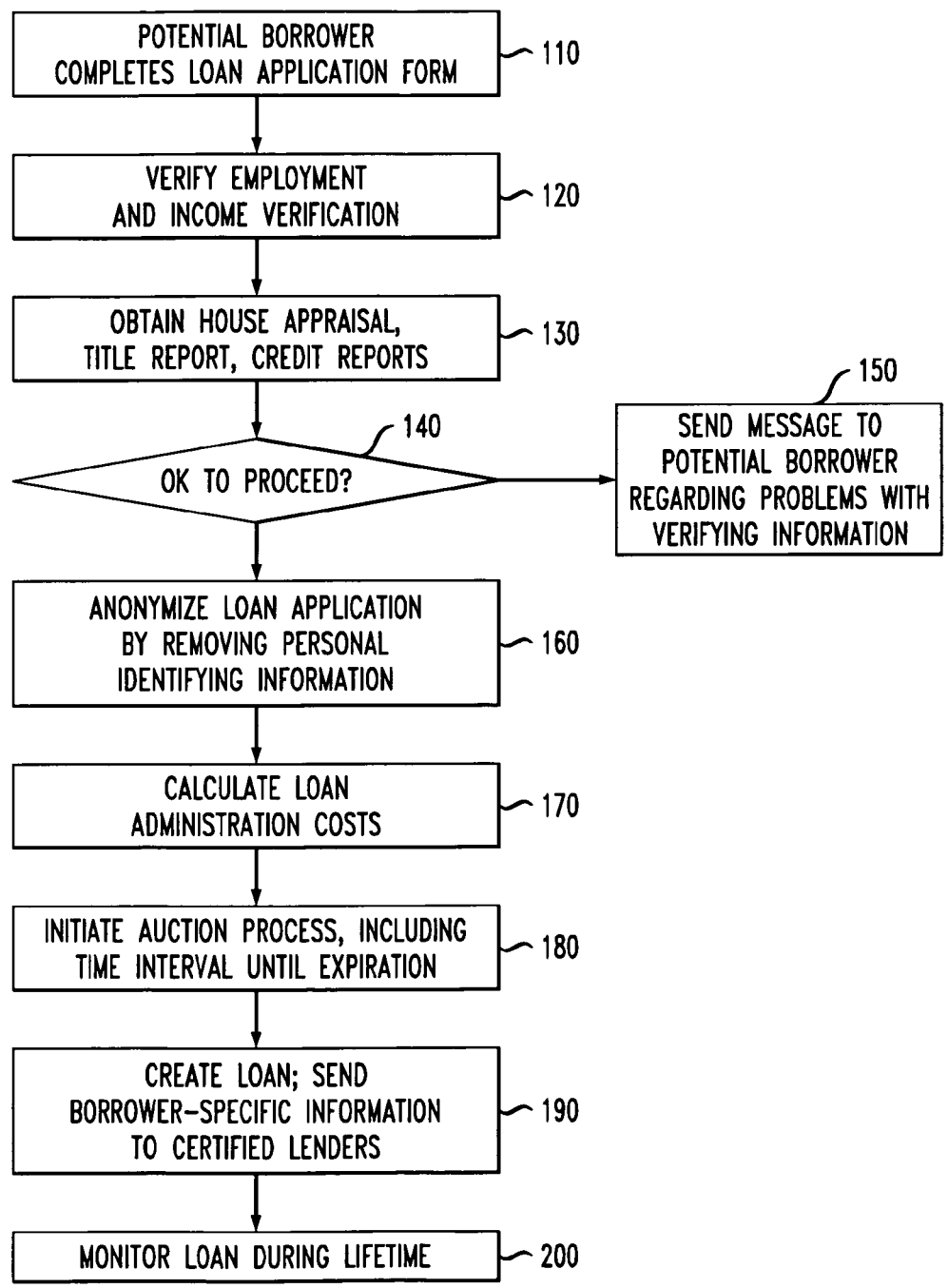
FIG. 1 contains a high level flow chart of the overall web-based loan auction process of the present invention.

FIG. 1 contains a flowchart 100 illustrating an exemplary process flow for the web-based loan process in accordance with the present invention. The process as explained using flowchart 100 is understood to be at a relatively high level, with various details of the present invention being further explained in accordance with the additional figures.

The inventive web-based loan auction process begins, in a manner similar to all loan processes, with a potential borrower completing a loan application form (step 110). In this case, the form is electronic in nature, allowing for the entered information to thereafter be stored and retrieved from a database of such applications maintained by the web-based auction service. The costs associated with the entire loan process will be discussed in detail below, once the overall process is explained. Referring back to FIG. 1, the next step in the process (step 120) is for the web-based loan auction service to itself verify various items within the loan application (such as, for example, the potential borrower's employment status and income). This verification process is performed in the same manner as in the prior art, with an "application fee" to be attributed to this process, as described below.

If this initial information is verified, the process follows, in a conventional manner, by obtaining associated "financial health" information for the potential borrower (step 130). In particular, this financial information typically includes an appraisal of the borrower's property (or properties—such as rental properties) involved in the loan transaction, title report and credit reports. It is contemplated that the credit reports would be digitally signed by the issuer (for example, Equifax) to ensure the potential lenders that the information is "original". Once all of the personal financial information has been received by the auction service, the information is evaluated in terms of the application being a bona fide application suitable to present to the individual lenders (step 140). If the information cannot be substantiated and/or verified, an electronic message is sent to the potential borrower (step 150) stating that the loan application has been "denied", and/or may request additional information be supplied. Additionally, the denial message may contain specific information describing the basis for the denial.

Presuming the information is acceptable the next step in the process is associated with an inventive aspect of the present invention—translating the application in an "anonymous" form (step 160). In accordance with the present invention, various individual potential lenders are permitted to view, on line, a verified loan application, but are not permitted to know the identity or other personal information about the potential borrower. Only the information associated with the financial aspects of the loan are retained in the "anonymized" form. Obviously, the web-based auction service retains the original form, including the personal information. As will be discussed below, specific place holders are inserted in the anonymized loan application form to provide a link to the original form. At this time, the digital signatures of the original application and associated credit reports (also digitally signed) are published to the potential lenders. The signatures are of no use at this point in time, but will enable a successful lender to later verify the original financial data using (for example) conventional Public Key Encryption (PKE) techniques.

One aspect of the loan process that is of interest to potential lenders is the amount of loan administration costs that they will need to bear. Based on the particular loan amount, as well as other known loan administration costs, these costs are then calculated (step 170) and included in the cost processing.

Once the financial particulars have been completed, the actual web-based loan auction process is begun (step 180). An auction form is created, as will be discussed in detail below, with the loan rate being the standard bank rate for similar loans. In one exemplary embodiment of the present invention, the auction service itself may be the initial "bidder" for the loan. The potential borrower can request that the auction remain "active" for a predetermined period of time. For example, the potential borrower may request that the loan be up for bidding for one day, a week, or any other suitable period of time. Advantageously, since this a web-based loan auction, the lenders may be from any geographic location; the potential borrower is not limited (as in conventional prior art loan arrangements) in reaching potential lenders.

As will be described below, potential lenders are pre-qualified and have a predetermined amount that has been designated in an escrow fund held by the auction service as his particular "pool" of funds available for lending to potential borrowers. Indeed, becoming a lender involves filling in an application much like that of a borrower, except that the application establishes that the lender has sufficient funds to invest in loans. There will be a minimum amount to be placed on deposit in an account with the auction service.

At the completion of the auction, a specific loan is created between the borrower and the plurality of lenders that have bid on the loan (step 190). At this point, borrow-specific information (from the original loan application) is forwarded to the certified lenders, who can then use the digital signatures to verify that there are no changes to the unanonymized fields within the loan application. In accordance with the present invention, the web-based auction service functions to monitor the loan over the life of the loan (step 200).

FIG. 2(a) illustrates an exemplary web-based loan application form 10 that may be used by a potential borrower in accordance with the teachings of the present invention. It is to be understood that this particular form is exemplary only; various other types of forms, arrangement of information, etc. may be used in accordance with the present invention in order to elucidate the necessary loan application information from the potential borrower.

The remaining figures describe the workings of the present invention in terms of performing an exemplary web-based loan auction, so that the operation of the inventive service can best be understood. FIG. 2(b) illustrates an exemplary completed application form 10, as filled in by an individual "John Queue" that desires to obtain a loan using the inventive web-based loan auction service. Once the application form is completed, the loan auction service will then use conventional means to verify John Queue's employment and income information. Thereafter, a title report and credit report is performed, using the conventional services well-known in the art. This supplemental financial information 15 is then added to loan application form, shown now as supplemental loan application 20 in FIG. 3. Indeed, application 20 is illustrated in its inventive "anonymized" form. That is, the name information is removed from the application, and the address information has been replaced with a number that allows for the web-based loan auction service to link this anonymized application with the original application. It is expected that the address number will contain the zip code (or postal zone) to allow the lender to identify the town and state where the borrower lives. The supplemented, anonymized loan application 20, once completed, is then published on the auction service website, as a new "loan" ready for review by lenders/bidders.

Each individual lender will evaluate this candidate differently, with the advantage of the present invention that individual lenders can tailor their investment strategies based upon the evaluation. For example, some lenders may feel that John Queue has too much credit card debt, and would be a risky investment. Others will believe that there is a sufficient amount of equity to offer a portion of requested loan amount.

FIGS. 4(a)-4(e) illustrate an exemplary process of implementing the web-based loan auction process in association with the present invention. It is to be understood that the web-based auction process may have a number of different characteristics. In particular, the auction can be defined as "binding" or "non-binding". The auction may defined as having a limit on the loan rate, or may be performed as an auction without limits, as these terms are understood in the art. The auction may also have a default interest rate, or may be permitted to utilize the various interest rates as defined by the lenders. Moreover, the lenders/bidders may be restricted from living within a certain geographic area (such as, for example, not within the same zip code, or within a 10-mile radius) as the borrower if the borrower has privacy concerns.

For the purposes of the present illustration, it will be presumed that the potential borrower desires for the auction to "run" for a period of 48 hours (clearly, the longer the auction runs, the lower the average lending rate that will be obtained for the borrower). The potential borrower has specified that they will accept any loan as long as the overall average rate is below 8% (presuming that conventional institutional lenders are offering similar loans at a rate of 10%). In this particular example, the loan auction service itself offers the first bid, as shown as loan auction table 30 of FIG. 4(a). The loan auction service (now acting as a lender rather than a loan preparer) has offered the loan at the nominal 10%.

It is next presumed that "Adam", a verified lender associated with the loan auction service, reviews the particulars of John Queue's application. Supposing that Adam is currently receiving 3% on a money market fund and wants to receive a better return on his money, offers a loan portion of $10,000, and offers a loan rate of 8.5%. FIG. 4(b) illustrates the status of the "auction" at this point in the bidding process. With Adam's bid, the current rate for the loan amount will now be:

(65000*10%+10000*8.5%)/75000=9.8%.

A few hours later, "Bob" is viewing John Queue's application and sees the initial bid entered by Adam. Bob decides to offer a loan of $20,000 to John at a rate of 8%, so that now the auction status is as shown in FIG. 4(c). It is to be noted that as each new lender is added to the loan auction the "active amount" associated with "LOANAUCTION" continues to reduce. "Carlene" now decides to participate in this loan auction. While she won't offer money at the low rate of 8%, she is willing to lend $7500 at 8.25%. The current auction bidding situation is illustrated in FIG. (d). Re-calculating the average interest rate, it will be found that the average is now at a value of 9.09%.

Lastly, Dan reviews the information in both John Queue's loan application and the current loan auction activity, deciding to loan $32,000 at a rate of 7.75%. The final overall average interest rate for the loan is now 7.915%. At this point, the active amount remaining in association with "LOANAUCTION" is $500, and the auction then completed when the time limit expires. In this particular example, the auction has produced an interest rate that saves the borrower over 2% when compared to conventional lending institutions. Additionally, each borrower is receiving a return on his/her money at an interest rate greater than currently offered by savings institutions.

When the auction terminates successfully, the next step in the process is the "closing" of the loan application and the purchase of legal insurance. For the purposes of the present invention, it is presumed that a simple pro-rating scheme is used. It is further presumed, for the sake of discussion, that the loan auction service advertises a loan application fee (payable by the borrower) of $100, and closing costs of $150. It is then assumed that the real cost of making the loan and obtaining insurance is $485. As compared with the "active loan amount" remaining in association with the auction service, there remains a total of $235 in costs that are unallocated. Pro-rating this amount of $235 against the amounts offered by each lender results in the following distribution of closing costs:

Loan auction service: $1.57, Adam: $31.33; Bob: $62.67; Carlene: $39.17; and Dan: $100.27.

At this point, the web-based loan auction service processes the results of the auction to create the actual loan and obtain an insurance policy for the loan. The loan will be between the web-based loan auction service and the borrower (thus avoiding the need to create a separate entity for each transaction). In turn, there will be a second set of transactions between the auction service and each of the lenders. This second transaction will specify that: (1) all of the payments (less management fees) will be passed from the borrower to the lenders in the ratio of their lending; (2) the lenders have no recourse against the auction service if the loan is defaulted; and (3) the loan auction service will at as the agent for the lenders in the event of default. Since the lenders' monies are already on deposit with the web-based loan auction service, there is no issue with the lenders following through with their commitments, since the money may simply be automatically transferred by the auction service.

In particular, and as another aspect of the web-based loan auction service, a particular lender will permitted to "bid" no more than the amount in the escrow account he has established with the auction service. It is to be understood that the various lenders will be able to transfer funds into the escrow account "during" an auction and thus increase an offer, if desired.

At this point in the loan auction process, the lenders will be provided (upon their request) with the original "un-anonymized" credit reports. Using standard cryptographic techniques, the loan application and credit reports are signed by the issuers to produce a set of digital signatures (DS0, DS1, DS2 and DS3), guaranteeing that the auction service has not changed the credit reports. Using the public keys of the respective issuers, along with the cryptographic hashes and standard tools for comparing file differences, the lenders can verify that the original credit reports have been anonymized, without any of the other information being changed.

During the life of the loan, there are several cases to consider. First, if the borrower pays what is due, when it is due, then the web-based loan auction service merely forwards these payments (less management fees) to the associated lenders. Alternatively, if the borrower passes certain pre-defined delays in payment (e.g., 15 days, 30 days, etc.), there will be penalties assessed by the loan auction service. These penalties are then split between the loan auction service and the lenders in the manner as specified in their initial agreements. If the loan passes into default, conventional collection procedures are instituted, and the insurance company is called on to act on behalf of the loan auction service in legal proceedings.

In particular, it is presumed that a number of loans are grouped together for insurance purposes, with a particular loan judged as having a 1% chance of going into default, with a cost for handling the default of $7500. As a result, an insurance company has an "expected" cost for $75 for each loan in the group. To make a profile and cover its overhead, the insurance company may charge the group of lenders $125 (for example) for legal insurance to cover all legal bills should the loan pass into default. When proceeds are collected (or if the security is sold at auction, as the case may be) the collected monies are then passed on to the lenders. Or, lastly, if the loan has been successful and has been paid off, the money is returned to the lenders.

It is to be understood that a borrower may be able apply for a new auction on the same loan at a future point in time after a predetermined "quiet period" (such as three years), as determined by the loan auction service (the quiet period being determined so as to allow for the original lenders to recoup their closing costs). It is presumed that there will be a reduced fee for the pre-auction processing and anonymization, as well as for closing, since this individual has previously been through the application process. Additionally, the auction will differ in that the lenders will have access to the payment history of the current loan, in addition to the credit report summary that had been previously obtained.

A significant feature of the web-based loan auction process of the present invention is that potential lenders may "search" through various loans that are published on the website. For example, a potential lender may want to look at home equity loans made in Pennsylvania during the previous 90 day period, for individuals where the FICO score was between 650 and 720.

Summarizing, the inventive web-based loan application process allows individual lenders to achieve greater returns than are possible from banking institutions, while also carefully controlling the lender's risk. Indeed, individual lenders will be able to, over time, develop their own methods for finding attractive loans among all of those available on the website. The inventive system also allows borrowers to achieve lower overall rates than possible from institutional lenders, by "cutting out the middle man".

One of ordinary skill in this art will readily appreciate that the present invention is not limited to the exact construction and methodology which has been described above and which is illustrated in the accompanying drawings, and that various modifications and changes can be made without departing from the natural equivalents within the scope of what is evident from the disclosure. It is intended that the scope of the present invention only be limited by the claims appended hereto.

What is claimed is:

1. A method of creating a loan agreement document by conducting a loan auction over the Internet between individual borrowers and individual lenders through a third party loan auction service provider transforming a loan application form into an executed loan agreement, the method comprising the steps of:
   a) establishing a plurality of authenticated individual lenders, with each individual lender forming a web-based escrow account for bidding, the escrow held by the third party loan auction service provider;
   b) preparing a web-based loan application for an individual borrower, including personal identifying information and financial information including desired loan amount, and including credit report information to create an original loan application document, the original loan application document stored within a first computer database controlled by the third party loan auction service provider;
   c) anonymizing, within a computer controlled by the third party loan auction service provider, the web-based original loan application document by replacing the personal identifying information with placeholding information known and controlled by the third party loan auction service, the anonymized loan application document stored within a second computer database controlled by the third party loan auction service provider and linked to the original loan application document stored in the first computer database;
   d) presenting the anonymized loan application on the third party loan auction service provider web site created by a computer controlled by the third party loan auction service provider for viewing by the plurality of authenticated individual lenders, as well as a set of digital signatures associated with the original documents;
   e) creating a loan auction form on the computer controlled by the third party loan auction service provider, listing the placing holding information and financial information;
   f) publishing the loan auction form on the third party loan auction service website for viewing by the plurality of authenticated individual lenders;
   g) performing a loan auction for a predetermined period of time, wherein one or more lenders from the plurality of authenticated individual lenders offers any portion of the desired loan amount, at separate interest rates determined by the offering individual lenders by entering the offered portion, with identifying lender information, in the loan auction form;
   h) closing the auction at a predetermined time, or when the complete loan amount has been taken by one or more authenticated individual lenders, each individual lender associated with a portion of the total loan amount;
   i) sending the original loan application documents to the offering individual lenders for authentication against the digital signatures;
   j) transforming within the computer controlled by the third party loan auction service provider, the original loan application document into: 1) a single loan agreement between the individual borrower and the third party loan auction service provider and 2) a plurality of loan agreements between the third party loan auction service provider and each offering individual lender from the plurality of authenticated individual lenders.

2. The method as defined in claim 1 wherein in performing step c), the personal identifying information is removed by the third party loan auction service provider and replaced with "placeholder" information that the third party loan auction service provider uses to correlate the anonymized loan application with the complete loan application.

3. The method as defined in claim 1 wherein the loan auction is performed for a predetermined period of time.

4. The method as defined in claim 1 wherein in performing step b) the third party loan auction service provider performs an initial clearance check on the information supplied by the borrower.

5. The method as defined in claim 1 wherein in performing step a), the method includes the steps of reviewing financial information for each potential individual lender, verifying the financial soundness of the potential individual lender, and creating an escrow account for each verified, authenticated individual lender with the third party loan auction service provider.

6. The method as defined in claim 1 wherein subsequent to performing step e), the method further includes the step of providing insurance to the authenticated individual lenders for an amount determined to cover legal costs of a default by the borrower.

* * * * *